United States Patent
Arai et al.

(10) Patent No.: US 8,395,981 B2
(45) Date of Patent: Mar. 12, 2013

(54) OPTICAL PICKUP DEVICE IN WHICH OPTICAL PART IS FIXEDLY JOINED TO PICKUP CASE BY LASER IRRADIATION

(75) Inventors: Satoshi Arai, Yokohama (JP); Hiroaki Furuichi, Kawasaki (JP); Kazumi Takahashi, Toyokawa (JP); Mitsuo Satake, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 1079 days.

(21) Appl. No.: 12/265,815

(22) Filed: Nov. 6, 2008

(65) Prior Publication Data

US 2009/0129239 A1 May 21, 2009

(30) Foreign Application Priority Data

Nov. 7, 2007 (JP) .................................. 2007-289733

(51) Int. Cl.
*G11B 7/135* (2006.01)
*G02B 7/02* (2006.01)

(52) U.S. Cl. .................................. 369/112.23; 359/811

(58) Field of Classification Search ............... 156/272.8; 219/121.6, 121.63, 121.64, 121.78–121.86; 264/482; 359/342, 719, 808, 811–830; 369/44.23, 369/44.24, 112.01, 112.23–112.26; 720/652, 720/654, 657–659, 672, 681–688
See application file for complete search history.

(56) References Cited

U.S. PATENT DOCUMENTS

2007/0258155 A1* 11/2007 Shimizu et al. ............... 359/819

FOREIGN PATENT DOCUMENTS

| JP | 64-79710 | 3/1989 |
|---|---|---|
| JP | 10-283639 | 10/1998 |
| JP | 2000-180688 | 6/2000 |
| JP | 2000-242960 | 9/2000 |
| JP | 2004-020867 | 1/2004 |
| JP | 2004-354438 | 12/2004 |
| JP | 2005-316044 | 11/2005 |
| JP | 2005-318044 | 11/2005 |

OTHER PUBLICATIONS

Machine-Assisted Translation of JP 2000242960 A.*
Official Action issued in Japanese Patent Application No. 2007-289733 on Feb. 28, 2012.

* cited by examiner

*Primary Examiner* — Nathan Danielsen
(74) *Attorney, Agent, or Firm* — Antonelli, Terry, Stout & Kraus, LLP.

(57) ABSTRACT

In laser welding an optical part to a pickup case of an optical pickup device, outgas deposition on a lens surface can be inhibited, and positional shifting of the optical part can be reduced. The optical part has a lens surface facing in an optical axis direction and a protruding part formed, to be joined to the pickup case, at an end portion thereof in a direction perpendicular to the optical axis. A joint surface between the protruding part and the pickup case extends in a direction parallel to the optical axis, and the joint surface is fixed by a weld portion formed by laser irradiation. The joint surface is parallel to a bottom surface of the pickup case, and the height from the bottom surface is approximately equal to the height of the center of the lens surface.

7 Claims, 15 Drawing Sheets

SECTION A-A'

SECTION A-A'

OPTICAL PICKUP DEVICE IN WHICH OPTICAL PART IS FIXEDLY JOINED TO PICKUP CASE BY LASER IRRADIATION

CLAIM OF PRIORITY

The present application claims priority from Japanese patent application serial no. JP 2007-289733, filed on Nov. 7, 2007, the content of which is hereby incorporated by reference into this application.

BACKGROUND OF THE INVENTION (1) Field of the Invention

The present invention relates to an optical pickup device which records and reproduces information to and from an optical disk in an optical disk drive unit and, more particularly, to a technique to fix an optical part in an optical pickup device.

(2) Description of the Related Art

Optical pickup devices which are used to record and reproduce information to and from optical disks such as CDs, DVDs, Blu-ray discs making use of blue semiconductor lasers, and HD-DVDs have a structure in which: a beam from a light-emitting device such as a laser diode is led to an objective lens via various lenses, prisms, and mirrors; the beam is focused on an optical disk; and the light reflected from the optical disk is received, for conversion into a photoelectric signal, by a photodiode via various lenses and mirrors including the objective lens.

In such a structure, optical parts including various lenses are fixed, with submicron accuracy, at predetermined locations on an optical path in a pickup case. Generally, to fix an optical part in a pickup case included in an optical pickup device: the optical part is positioned using a jig; an ultraviolet-curing adhesive is applied to a predetermined area; and the adhesive is cured by ultraviolet ray irradiation. When, in such a structure, an optical part is fixed in position using an ultraviolet-curing adhesive, however, the optical part can be positionally shifted, not to be restored into position, to degrade the reliability of the optical pickup device. Such positional shifting of the optical part can be caused, for example, by changes in ambient conditions or variations in the area where the adhesive is applied or in the amount of adhesive application. Furthermore, to allow an adhesive to securely cure into a stable condition, it is necessary to secure adequate annealing time and ultraviolet ray irradiation time at a sacrifice of productivity.

To cope with the above problems, fixing an optical part to a pickup case by laser welding instead of using an adhesive has been proposed as a method which can improve the positional stability of the optical part and increase productivity while securing adequate joint strength between the optical part and the pickup case.

In Japanese Patent Laid-Open No. 2004-20867, it is proposed to reduce the cost of producing a film unit having plural components including lenses by laser welding a plastic spherical lens to a cover without using any adhesive or any special tool.

In Japanese Patent Laid-Open No. 2004-354438, a method of joining a resin optical part to a resin holder is proposed. In the method, a laser beam is applied to the resin holder in an environment where an inactive gas is spewed, and molten resin is allowed to deposit on the optical part, thereby realizing a joint to cause no aberration.

In Japanese Patent Laid-Open No. 2005-316044, a lens fixing method for a lens unit which includes a lens and a lens frame is proposed. In the method, a lens to be included in a lens unit is first fitted in the lens unit, and an outer peripheral portion of the lens is then laser welded. In this way, the lens can be quickly fixed in the lens unit with high accuracy.

SUMMARY OF THE INVENTION

According to the techniques disclosed in the Japanese Patent Laid-Open Nos. 2004-20867 and 2005-316044, even though a lens can be fixed with high accuracy, it is laser welded to a lens frame or case in a same plane in which a lens surface is formed. It is therefore possible that the outgas generated when the resin, of which the lens is formed, is melted and evaporated is allowed to deposit on the lens surface to degrade the optical properties of the lens. Even though the lens surfaces of optical parts used in an optical pickup device are coated, the heat resistance of such coating is low. Therefore, when an optical part is laser welded to form a surface-to-surface joint in an optical pickup device, the heat generated by laser welding and conducted to the lens surfaces can cause the lens surface coatings to be removed.

In an environment where an inactive gas is spewed as disclosed in the Japanese Patent Laid-Open No. 2004-354438, causing a certain amount of molten resin to deposit in an optimum area is difficult, so that it is difficult to achieve a high yield. Furthermore, when such a method is used, it is also difficult to form uniform joints by laser welding, and changes in ambient conditions can easily cause joints to be positionally shifted.

An object of the present invention is to provide a highly reliable optical pickup device which can be produced with a high yield by inhibiting, in a laser welding process, both outgas deposition on lens surfaces and coating removal from the lens surfaces and reducing positional shifting of optical parts due to changes in ambient conditions.

The present invention provides an optical pickup device comprising a pickup case formed of a first resin and an optical part formed of a second resin, the optical part being fixedly joined to the pickup case at a predetermined location on an optical path of the pickup case. In the optical pickup device: the optical part has a lens surface facing in an optical axis direction and a protruding part formed, to be joined to the pickup case, at an end portion thereof in a direction perpendicular to the optical axis; and a joint surface between the protruding part and the pickup case extends in a direction parallel to the optical axis; and the joint surface is fixed by a weld portion formed by laser irradiation.

In the optical pickup device, the joint surface is parallel to a bottom surface of the pickup case, and the height, from the bottom surface of the pickup case is approximately equal to the height of the center of the lens surface. The length L1 in the optical axis direction of the protruding part of the optical part is smaller than the length L2 in the optical axis direction of the optical part. An end portion of the weld portion extends to outside a joint area between the protruding part of the optical part and the pickup case.

The optical pickup case and the optical part may be fixed together by, in addition to formation of the laser weld portion on the optical part, applying an adhesive to (filling an adhesive in) at least one space separating the optical pickup case and the optical part. In such a case, the adhesive is preferably lower in modulus of elasticity and hardness than a material of which the optical part is formed.

According to the present invention, the production yields and reliability of optical pickup devices can be improved by inhibiting, in laser welding processes, both outgas deposition on their lens surfaces and coating removal from the lens surfaces and greatly reducing positional shifting of their optical parts.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Embodiments will be described below with reference to the accompanying drawings.

Figure 20:
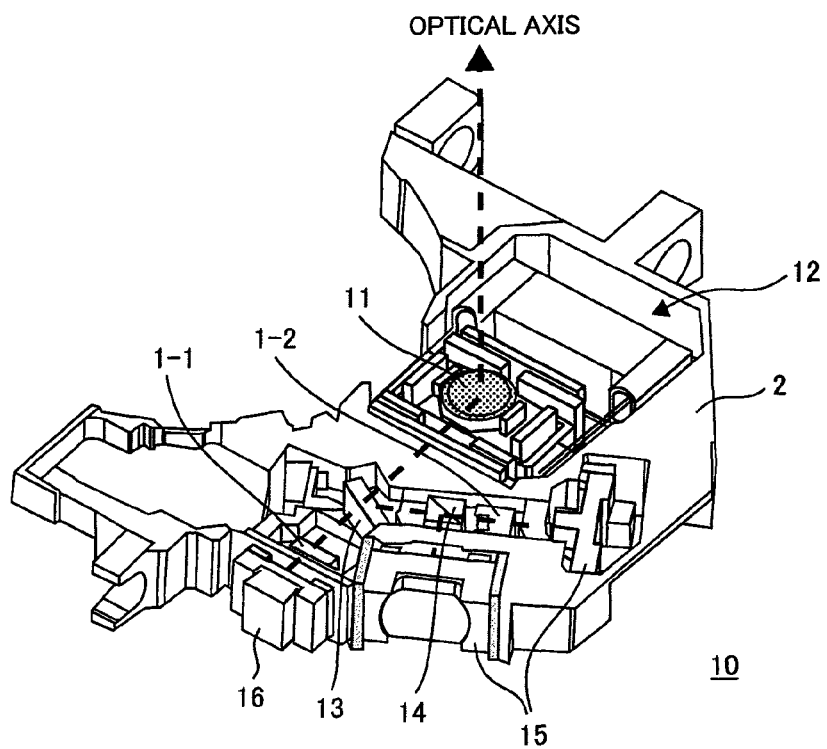
FIG. 20 is an external view of an example optical pickup device 10 according to the present invention.

FIG. 20 is an external view of an example optical pickup device 10 according to the present invention. A detection lens 1-1 and an auxiliary lens 1-2 are optical parts to be fixed to a pickup case 2 by laser welding. In FIG. 20, reference numeral 11 denotes an objective lens; 12, an actuator unit; 13, a half mirror; 14, a prism; 15, a laser diode; and 16, a photodiode.

Figure 21:
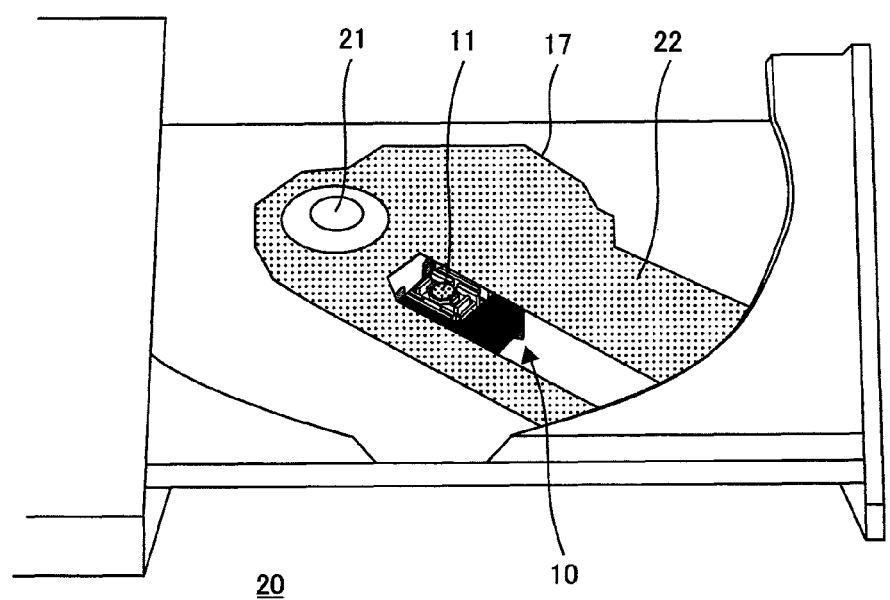
FIG. 21 is a diagram showing an example optical disk drive unit 20 incorporating the optical pickup device 10.

FIG. 21 is a diagram showing an example optical disk drive unit 20 incorporating the optical pickup device 10. In FIG. 21, reference numeral 17 denotes a metal cover; 21, a spindle motor; and 22, a driver cover.

Figure 22A:
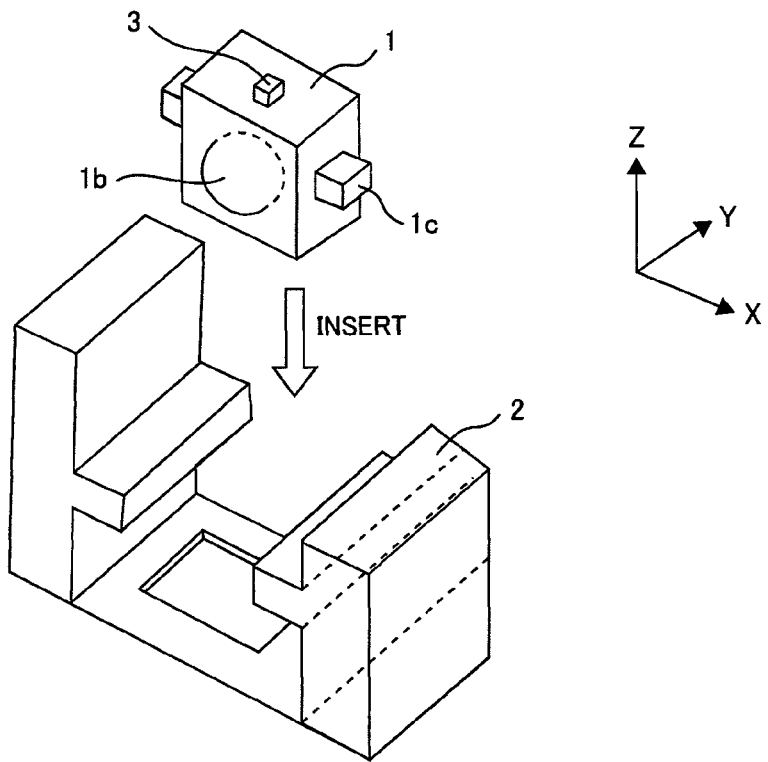
FIGS. 22A and 22B are diagrams showing how an optical part 1 is assembled to the pickup case 2 in the optical pickup device 10.
Figure 22B:
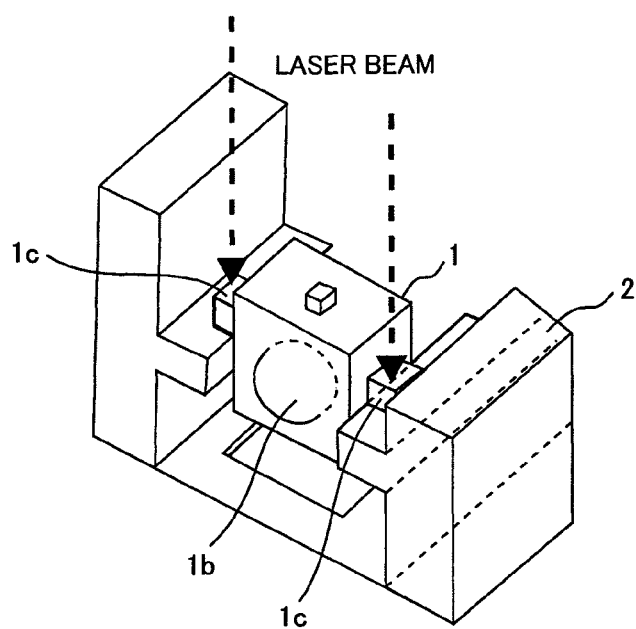

FIGS. 22A and 22B are diagrams showing how an optical part 1 is assembled to the pickup case 2 in the optical pickup device 10. FIG. 22A shows the optical part 1 and the pickup case 2 in a state before being assembled together. FIG. 22B shows them with the optical part 1 inserted in and laser welded to the pickup case 2. Referring to FIG. 22A, the optical part 1 is, for example, a concave lens having a concave lens surface 1b facing in the Y direction and protruding parts 1c protruding in the X direction to be laser welded to the pickup case 2. Reference numeral 3 denotes a gate portion used to mold the concave lens.

Other than the concave lens, a grating lens, coupling lens, auxiliary lens, or detection lens, for example, can also be the optical part 1 to be fixed by laser welding. Such lenses are formed, with priority on transparency and aberration property, of a transparent amorphous resin with relatively low heat resistance which is based on, for example, cycloolefin resin, PMMA (polymethylmethacrylate), fluorene-based polyester, or polycarbonate. The pickup case 2 is formed of black or gray crystalline resin which is fairly heat resistant having a high melting point, for example, PPS (polyphenylene sulfide), PBT (polybutylene terephthalate), or liquid crystal polymer.

Since the resin optical part 1 is formed by molding, the gate portion 3 inevitably remains. In cases where the height of the gate portion 3 does not pose any problem, the gate portion 3 is preferably formed on the top side (to face in the Z direction) of the optical pickup as shown in FIGS. 22A and 22B. In cases where the height of the gate portion 3 makes it inappropriate to form the gate portion 3 on the top side of the optical pickup, the gate portion 3 may be formed, like the protruding parts 1c, on a side (to face in the X direction) of the optical part 1 avoiding where the protruding part 1c on the same side is formed.

Referring to FIG. 22B, the optical part 1 inserted in the pickup case 2 is fixedly welded to the pickup case 2 by irradiating each of the protruding parts 1c of the optical part 1 with a laser beam from above (in the Z direction). Laser welding conditions for the protruding parts 1c such as laser spot size, laser power, laser irradiation time, laser intensity distribution, and laser welding pressure are determined, based on the laser irradiation wavelength to be used, by taking into consideration, for example, the laser permeability and absorptivity, heat conductivity, and welding compatibility of or between the materials to be welded. When the laser beam permeability of resin is taken into consideration, the light source to be used for laser welding is preferably a laser in the infrared region, for example, a semiconductor laser or YAG laser. The intensity distribution of the laser light source can be arranged using accessory lenses into, for example, a Gaussian distribution or top-hat distribution. To achieve uniform laser welding, a laser light source having a top-hat intensity distribution is preferable.

When laser welding two flat parts, the adhesion properties between them greatly affect their weldability. In this regard, the resin lens and resin pickup case to be laser welded together are desired to have surface roughness such that the distance between their surfaces is 30 μm or less in a state with the optical part pressed.

Generally, optical parts for use in an optical pickup application are formed of an amorphous resin, and a pickup case is formed of a crystalline resin, but laser welding can also be applied to other resin combinations.

The protruding parts 1c of the optical part 1 and their portions to be welded may have various shapes as in the following embodiments.

Embodiment 1

Figure 1A:
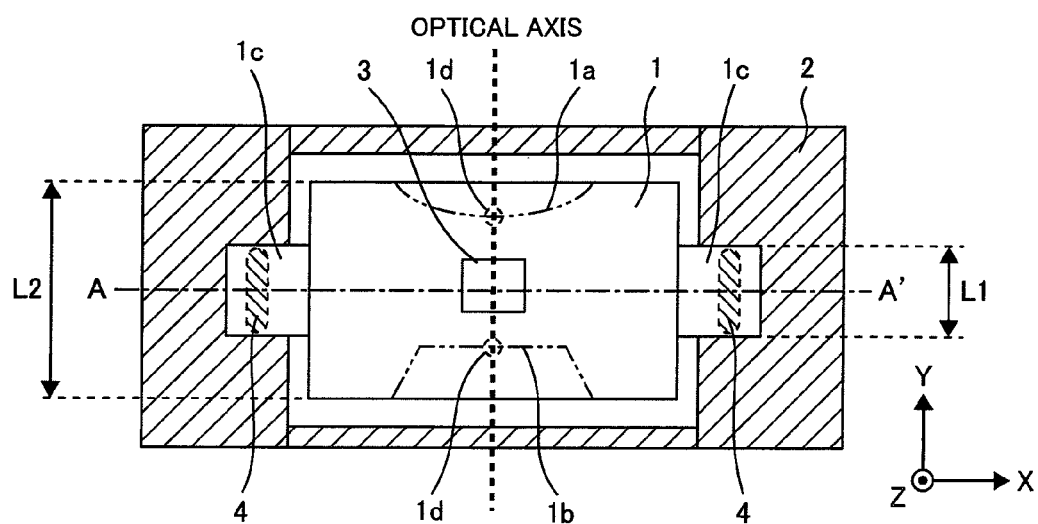
FIGS. 1A and 1B are structural diagrams showing how an optical part 1 and a pickup case 2 both included in an optical pickup device according to an embodiment of the present invention are fixed together by laser welding (Embodiment 1)
Figure 1B:
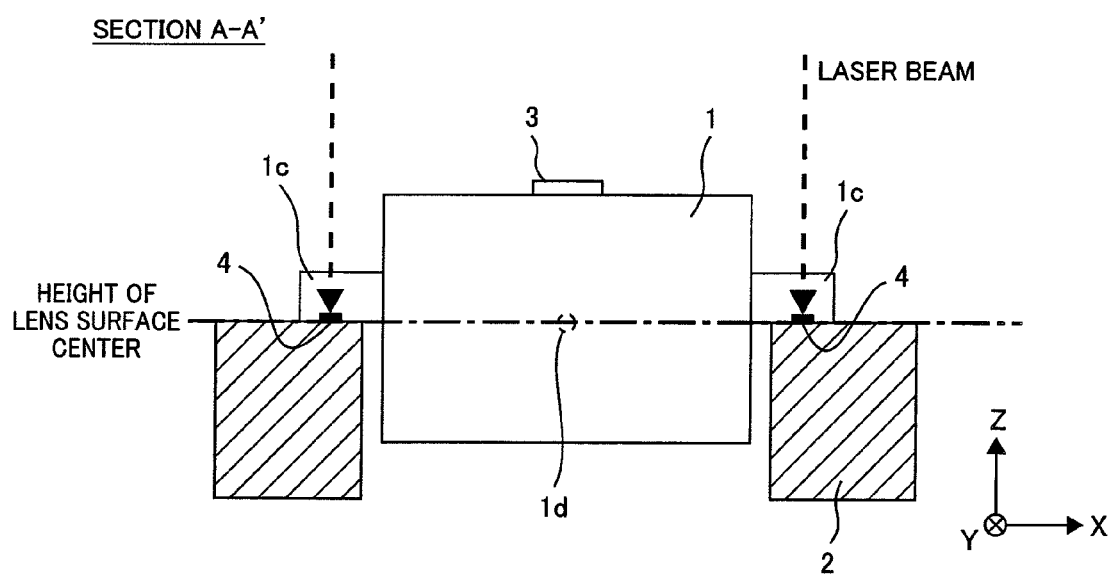

FIGS. 1A and 1B are structural diagrams showing how an optical part 1 and a pickup case 2 both included in an optical pickup device according to an embodiment are fixed together by laser welding. FIG. 1A is a plan view as seen from the Z direction (from above). FIG. 1B is a sectional view along line A-A' of FIG. 1A as seen from the Y direction (optical axis direction). The optical part 1 has concave lens surfaces 1a and 1b facing in the optical axis direction (Y direction) and protruding parts 1c, to be laser welded to the pickup case 2, at both end portions thereof in the X direction. In FIGS. 1A and 1B, reference codes "1d" denotes a lens center portion through which the optical axis extends.

To laser weld the optical part 1 to the pickup case 2: the optical part 1 is held using, for example, a chuck or a sucking jig; the lower surface of each of the protruding parts 1c is pressed against the upper surface of the pickup case 2; and the lower surface of the protruding part 1c on each side is laser welded to the upper surface of the pickup case 2 by applying a laser beam in the Z direction to the lower surface through the protruding part 1c. In FIGS. 1A and 1B, reference numerals 4 each denote a laser weld portion of the protruding parts 1c. In the present embodiment, the laser weld portions 4 are linear portions extending along the optical axis direction. To form the laser weld portions 4 linearly as predetermined, either a laser source or the optical pickup device 10 held by a jig is kept moving while a laser beam is applied to the protruding parts 1c. When the resin material of which the optical part 1 is formed is irradiated with a laser beam, its portion irradiated with the laser beam and peripheral part of the portion are locally heated to a high temperature to generate no small amount of outgas. Components of the outgas, if allowed to deposit on the lens surfaces 1a and 1b through which light passes, remarkably degrades the optical properties of the lens. The optical pickup device 10 is therefore required to have a structure in which the outgas does not easily deposit on the lens surfaces 1a and 1b. The lens surfaces 1a and 1b included in the optical part 1 are coated with a material with low heat resistance. The structure of the optical pickup device 10 is therefore also required to be such that laser welding does not easily cause the coatings of the lens surfaces 1a and 1b to be removed.

In the present embodiment, the protruding parts 1c to be laser welded to the pickup case 2 are provided at end portions in the X direction of the optical part 1 to be away from the optical axis, and the joint surface (plane XY) between each of the protruding parts 1c and the pickup case 2 is perpendicular to the lens surfaces 1a and 1b (plane XZ) (i.e. parallel to the optical axis). Hence, the outgas generated at the laser weld portions 4 does not easily deposit on the lens surfaces 1a and 1b. Furthermore, the length L1 along the optical axis of each of the protruding parts 1c is smaller than the length L2 along the optical axis of the optical part 1, so that the outgas does not easily reach and deposit on the lens surfaces 1a and 1b. In the present embodiment, the lens surfaces 1a and 1b are located away from the laser weld portions 4. This prevents the heat conducted from the laser weld portions 4 from causing the coatings of the lens surfaces 1a and 1b to be removed.

The optical pickup device 10 is required to operate reliably even when ambient conditions such as temperature and humidity change. In the present embodiment, the protruding parts 1c are welded to the pickup case 2 surface-to-surface, so that the difference in linear expansion coefficient between the protruding parts 1c and the pickup case 2 can noticeably affect the welding strength between them. Hence, the welding gap is made as small as possible so as to reduce the thermal stress applied to the laser weld portion. In cases where the optical part 1 is fixed to the pickup case 2 by welding the protruding parts 1c on both sides of the optical axis, the height, from the bottom surface of the pickup case 2, of the joint surfaces (the laser weld portions 4) is about the same as the height of the lens center portion 1d. This allows the height of the lens center portion 1d to stay stable even when ambient conditions change.

The shapes of the protruding parts 1a and the laser weld portions 4 can be modified in various ways as described in the following.

Figure 2:
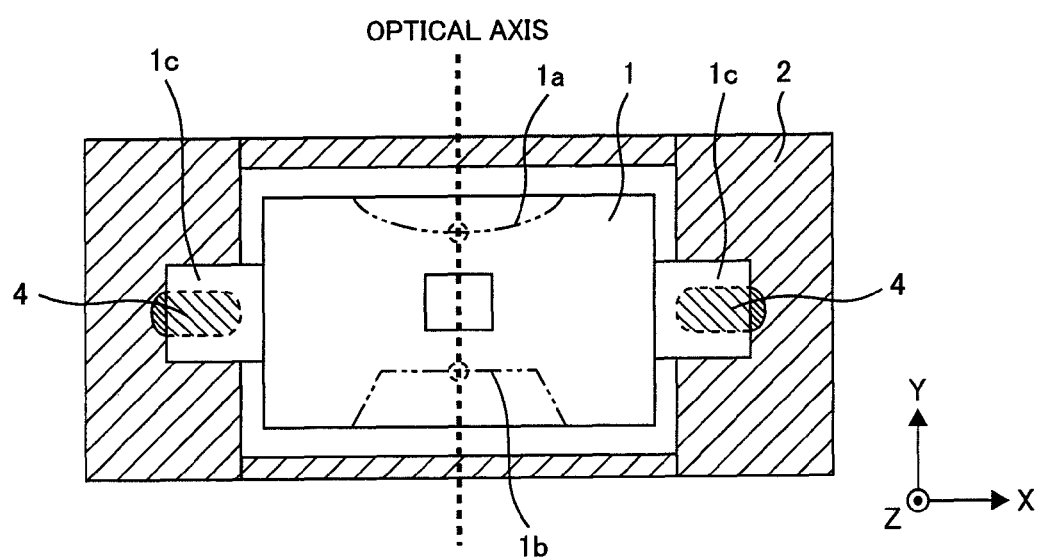
FIG. 2 is a plan view showing an example of modification of laser weld portions 4 shown in FIGS. 1A and 1B.

FIG. 2 is a plan view showing an example of modification of the laser weld portions 4. Whereas the laser weld portions 4 shown in FIG. 1 extend linearly along the optical axis (in the Y direction), the laser weld portions 4 shown in FIG. 2 extend perpendicularly to the optical axis (in the X direction). The laser weld portions 4 shown in FIGS. 1 and 2 are linearly shaped securing large weld areas to obtain high welding strength.

Figure 3:
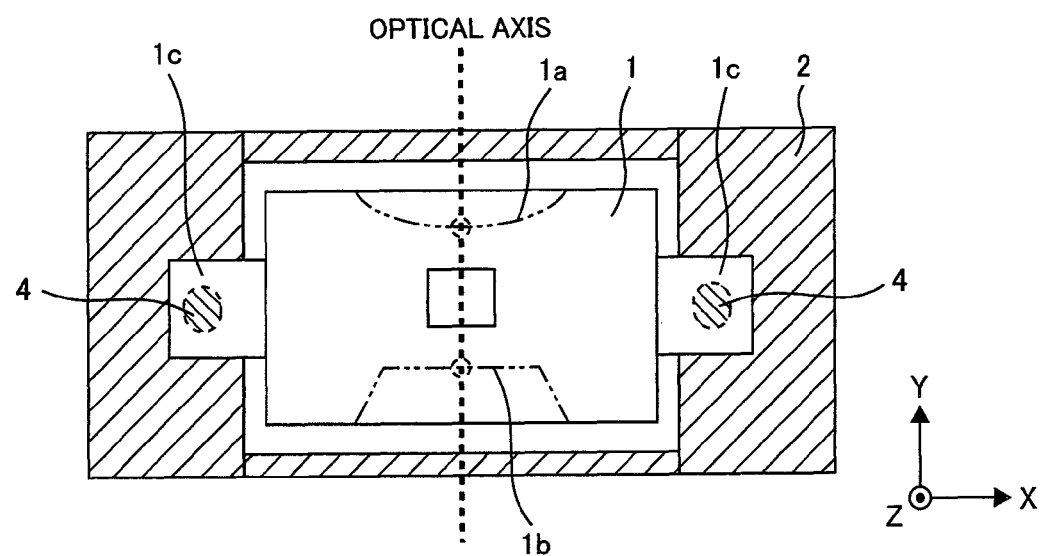
FIG. 3 is a plan view showing another example of modification of the laser weld portions 4 shown in FIGS. 1A and 1B.

FIG. 3 is a plan view showing another example of modification of the laser weld portions 4. In this example, the laser weld portions 4 are formed by spot welding. Spot welding may be used in cases where resin materials to be welded can provide adequate welding strengths. Spot welding performed in such cases can reduce the laser irradiation time to lengthen the laser source life.

Figure 4:
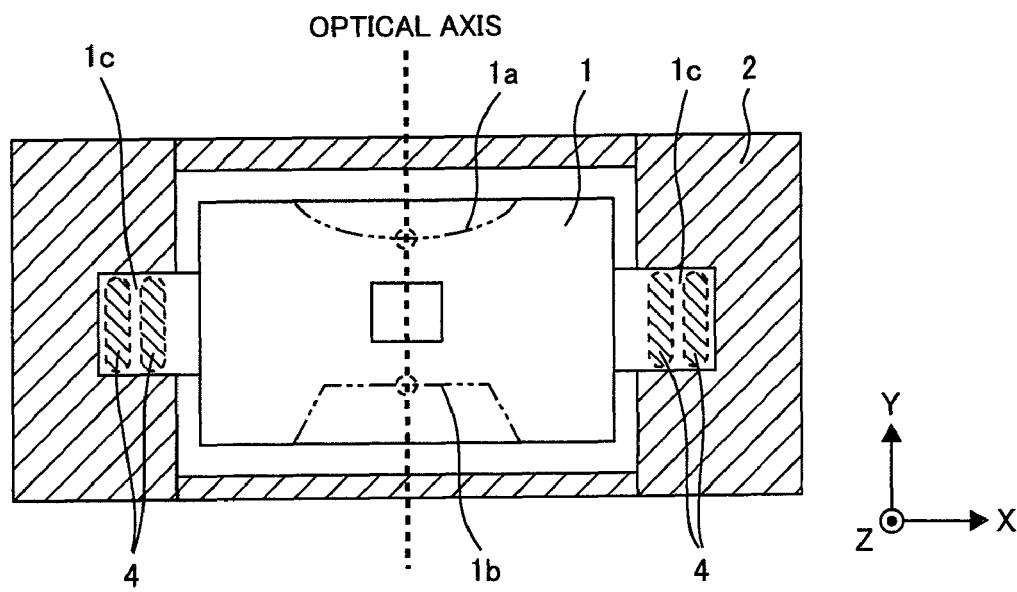
FIG. 4 is a plan view showing still another example of modification of the laser weld portions 4 shown in FIGS. 1A and 1B.

FIG. 4 is a plan view showing still another example of modification of the laser weld portions 4. In this example, the plural laser weld portions 4 are formed on each side of the optical axis (two linearly shaped laser weld portions on each of the protruding parts 1c).

Figure 5:
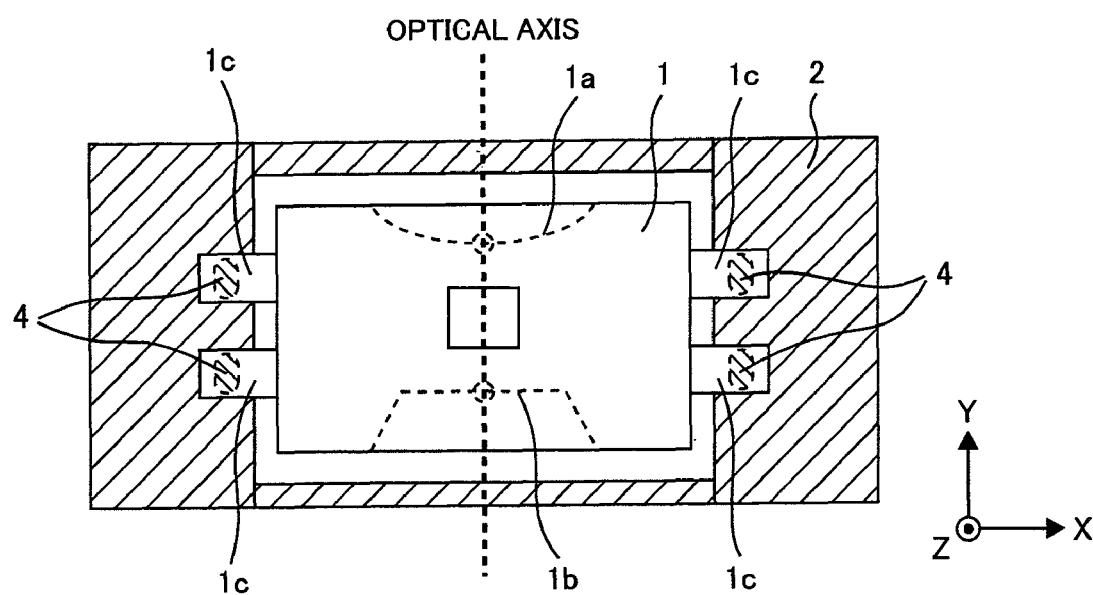
FIG. 5 is a plan view showing an example of modification of protruding parts 1c shown in FIGS. 1A and 1B.

FIG. 5 is a plan view showing an example of modification of the protruding parts 1c. In this example, plural protruding parts 1c are provided on each side of the optical axis (two protruding parts provided at each of the two end portions in a direction perpendicular to the optical axis of the optical part 1).

Depending on the optical part structure, forming plural laser weld portions 4 on each side of the optical axis may make welding jig designing simpler as explained in the following. The optical part 1 is currently available with as small a lateral dimension (dimension in the X direction) as about 5 mm, and it may become smaller in the future. To laser weld the optical part 1 of such a small size to the pickup case 2, it is necessary to press the optical part 1 by a jig and accurately emit a laser beam onto each of the protruding parts 1c protruding not more than 1 mm. Generally, the incident laser beam used for welding is emitted in the height direction (Z direction) of the optical pickup device 10. Depending on the welding spot size, however, it is necessary to irradiate each portion to be welded with a laser beam through a working distance not exceeding 30 mm. Since the working distance is inclusive of the thickness of the optical part 1, the net distance between the laser source and the optical part 1 is shorter than the working distance. A problem possibly posed in such a case is that the jig used to hold the optical part 1 covers portions to be irradiated with a laser beam of the optical part 1.

Figure 6:
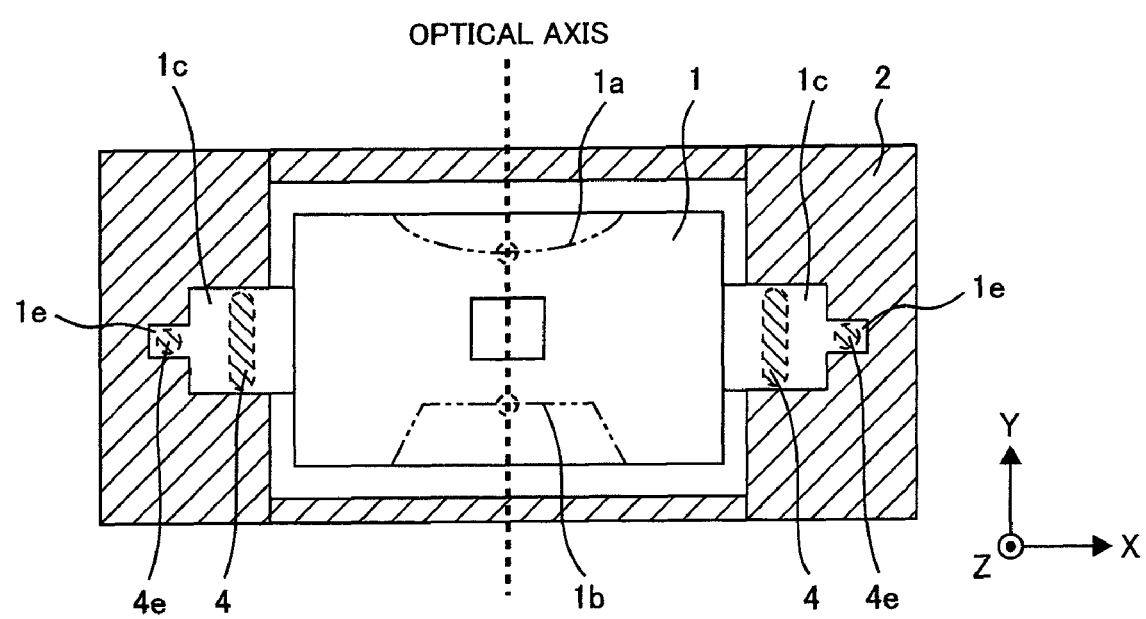
FIG. 6 is a plan view showing another example of modification of the protruding parts 1c shown in FIGS. 1A and 1B.

FIG. 6 is a plan view showing another example of modification of the protruding parts 1c each provided with plural laser weld portions. In this example, each of the protruding parts 1c has, at an end portion thereof not interfered with by any jig or any laser source (or any laser beam), an auxiliary protruding part 1e to be spot welded (as denoted by "4e") to temporarily fix the optical part 1. After the optical part 1 is temporarily fixed, the jig used for spot welding is removed, and each of the protruding parts 1c is linearly welded (as denoted by "4"). As the spot welds 4e are only for temporarily fixing the optical part 1, they need not be strictly at their optimum locations.

Embodiment 2

Figure 7A:
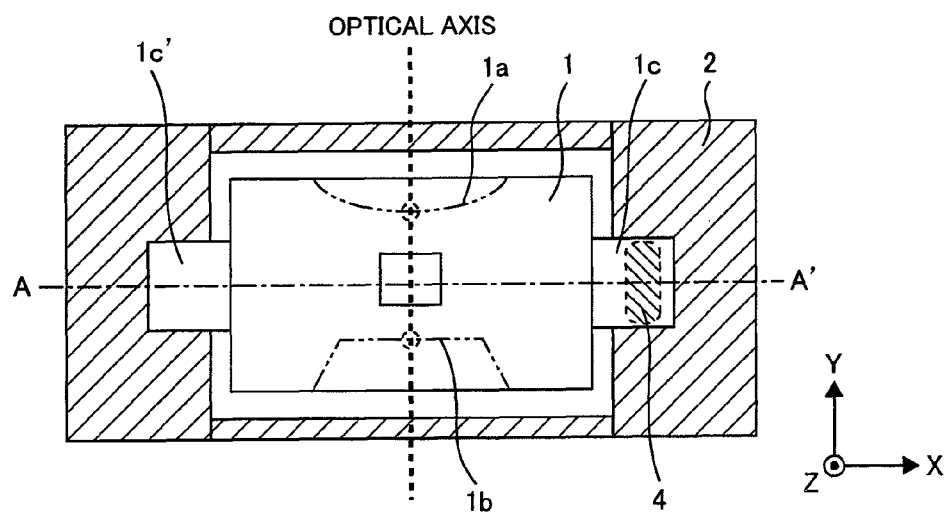
FIGS. 7A and 7B are structural diagrams showing how an optical part 1 and a pickup case 2 both included in an optical pickup device according to another embodiment of the present invention are fixed together by laser welding (Embodiment 2)
Figure 7B:
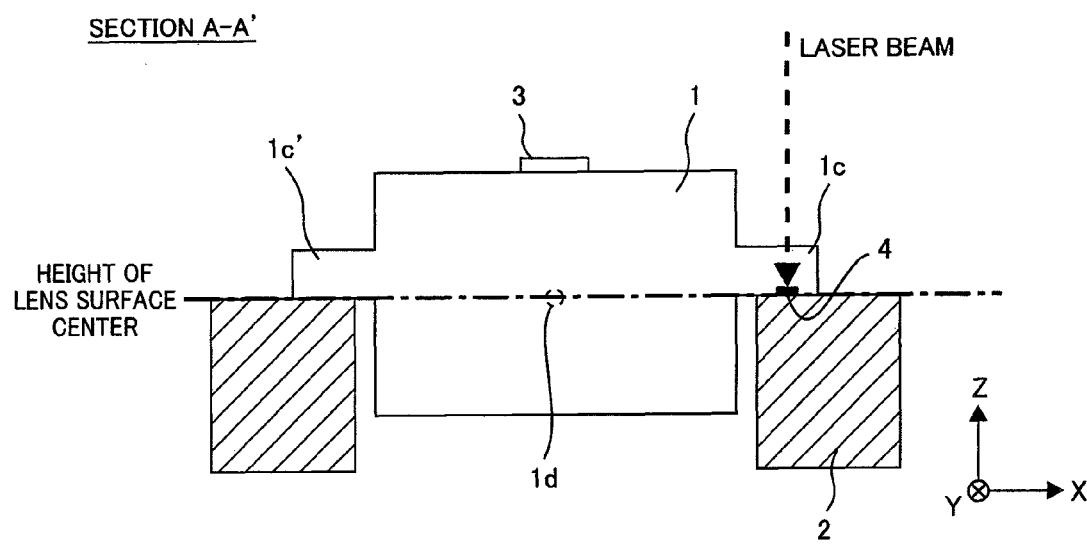

FIGS. 7A and 7B are structural diagrams showing how an optical part 1 and a pickup case 2 both included in an optical pickup device according to another embodiment are fixed together by laser welding. FIG. 7A is a plan view as seen from the Z direction. FIG. 7B is a sectional view along line A-A' of FIG. 7A as seen from the Y direction. In this embodiment, two protruding parts 1c and 1c' are provided mutually symmetrically with respect to the optical axis. A laser weld portion 4 is provided only on the protruding part 1c. The protruding part 1c' is not laser welded. When only one of the two protruding parts is laser welded, the welding strength between the optical part 1 and the pickup case 2 is initially smaller than when both the two protruding parts are laser welded as in Embodiment 2, but the stress to which the laser weld portion 4 is subjected can be made smaller. Therefore, in cases where the two resin materials to be laser welded can secure adequate initial welding strength between them and the difference in linear expansion coefficient between them can largely affect the welding strength between them, laser welding only one of the two protruding parts may be effective.

Normally, the optical part 1 is formed of an amorphous resin, and the pickup case 2 is formed of a crystalline resin. To improve the rigidity and dimensional stability of the crystalline resin to be used, the crystalline resin is, in many cases, added to by 10% or more of a glass filler which is harder than the resin. As a result, the difference in linear expansion coefficient between the optical part 1 and the pickup case 2 becomes larger than when the glass filler is not added to the crystalline resin. With the optical part 1 and the pickup case 2 having such a large difference in linear expansion coefficient, laser welding the two protruding parts of the optical part 1 to the pickup case 2 results in subjecting the two laser weld portions to an excessively large stress, possibly causing the laser weld portions to be broken. Laser welding only one of the two protruding parts of the optical part 1 to the pickup case 2 can reduce the stress to which the laser weld portion is subjected. This stabilizes the strength and secures the reliability of the laser weld portion.

When only one of the two protruding parts of the optical part 1 is laser welded to the pickup case 2, the stresses to which the lens surfaces 1a and 1b of the optical part 1 are subjected can also be reduced for the same reasons as described above. The optical part 1 is required not to cause large aberration changes when ambient conditions change. When the optical part 1 whose aberration largely changes is to be used, however, the optical pickup device structure in which the optical part 1 is fixed to the pickup case 2 at only one laser weld portion is effective.

In the present embodiment, the optical part 1 is fixed to the pickup case at only one laser weld portion, so that, when operating at high temperature, the position of the optical part 1 (position of the lens center 1d) is shifted, relative to its position at low temperature, in the X direction (in the lateral direction) by a distance corresponding to the difference in its linear expansion coefficient between at high temperature and at low temperature. To cope with the above problem, the optical part 1 may be laser welded at a position shifted in advance in the X direction by taking into account the difference in its linear expansion coefficient between at high temperature and at low temperature. This can prevent misalignment of the optical axis during operation.

In the present embodiment, too, the not-to-be-welded protruding part 1c' similar to the protruding part 1c to be laser welded is provided on the side opposite to the protruding part 1c (on the left side as seen in FIGS. 7A and 7B). The bottom surfaces of the protruding parts 1c and 1c' are preferably at the same height as the lens center portion 1d.

Embodiment 3

Figure 8A:
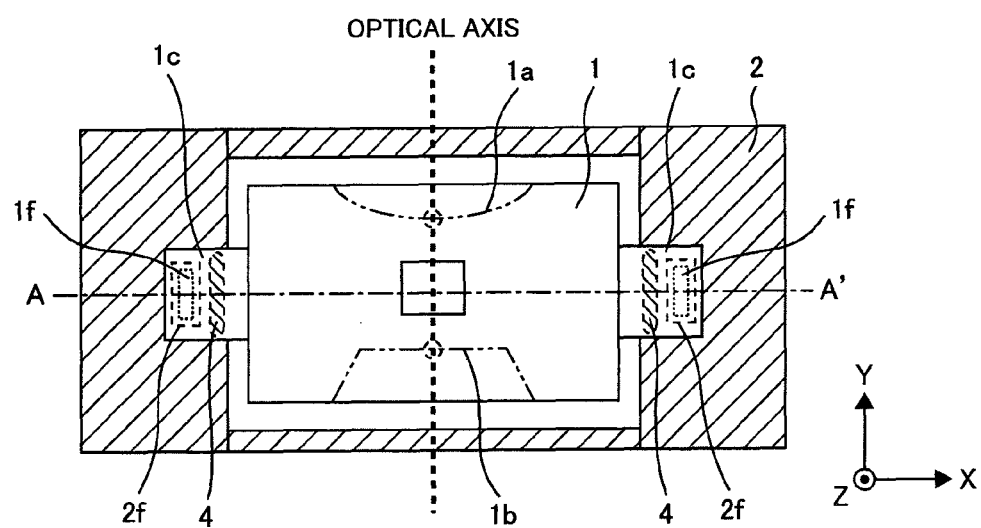
FIGS. 8A and 8B are structural diagrams showing how an optical part 1 and a pickup case 2 both included in an optical pickup device according to a still another embodiment of the present invention are fixed together by laser welding (Embodiment 3)
Figure 8B:
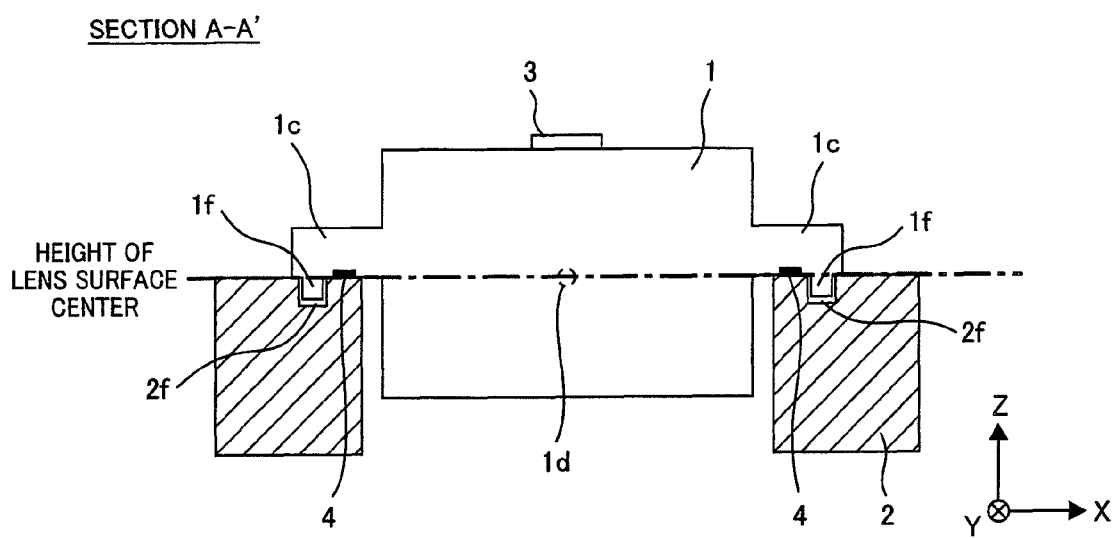

FIGS. 8A and 8B are structural diagrams showing how an optical part 1 and a pickup case 2 both included in an optical pickup device according to a still another embodiment are fixed together by laser welding. FIG. 8A is a plan view as seen from the Z direction. FIG. 8B is a sectional view along line A-A' of FIG. 8A as seen from the Y direction. In this embodiment, a protruding part 1c formed on each side with respect to the optical axis of the optical part 1 has a convex part 1f formed on its surface to be laser welded to the pickup case 2. The surface portion to which the convex part 1f is to be laser welded of the pickup case 2 has a concave part 2f corresponding to the convex part 1f. The optical part 1 is laser welded to the pickup case 2 with the convex parts 1f and concave parts 2f matingly fitted together. According to the present embodiment, the convex parts 1f and concave parts 2f make it easy to position the optical part 1 and the pickup case 2 for laser welding. It is advisable to make the concave parts 2f of the pickup case 2 larger than the convex parts 1f of the optical part 1 taking into account the molding accuracy of the respective resins. The convex parts 1f and concave parts 2f need not necessarily be shaped as shown in FIGS. 8A and 8B. They may be shaped, for example, to have a V-shaped section.

Figure 9A:
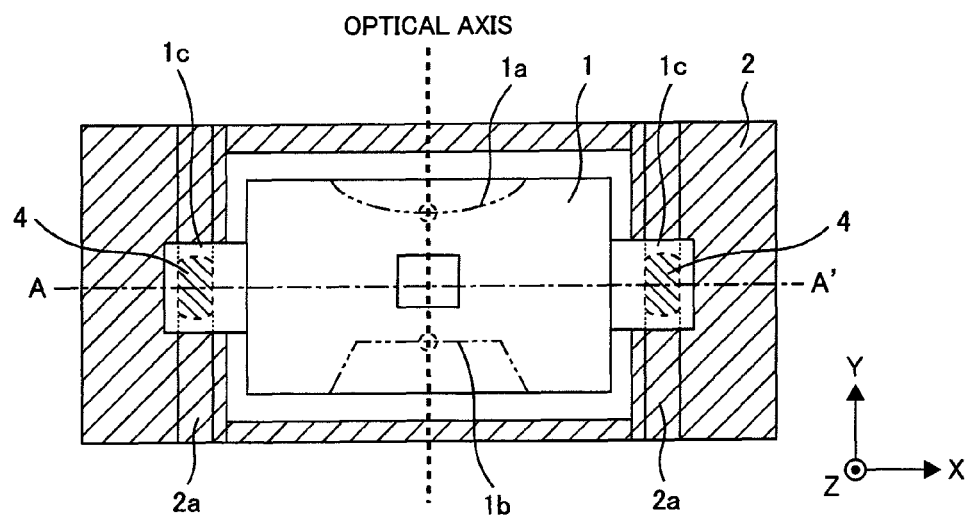
FIGS. 9A and 9B are structural diagrams showing how an optical part 1 and a pickup case 2 both included in an optical pickup device according to still another embodiment of the present invention are fixed together by laser welding.
Figure 9B:
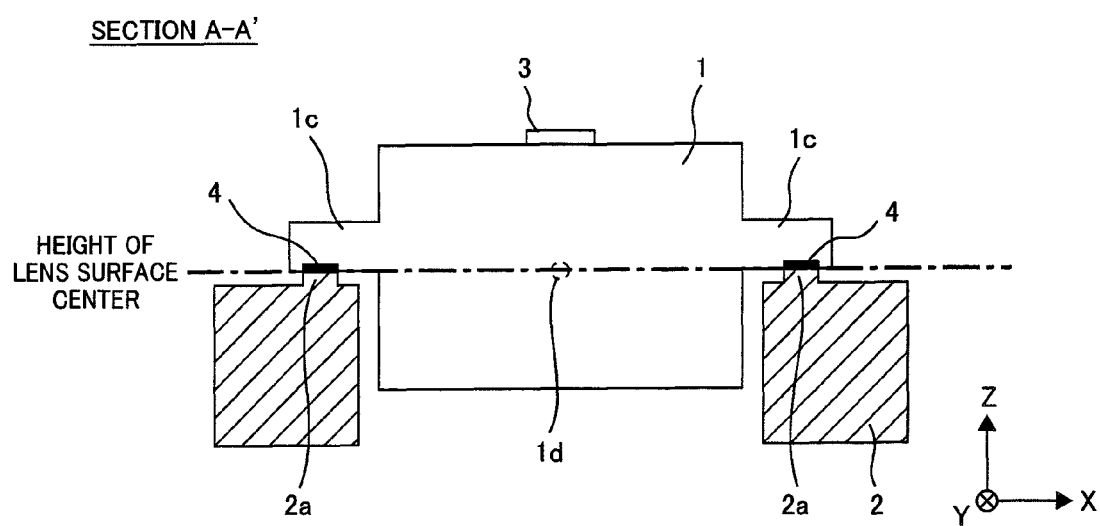

FIGS. 9A and 9B are structural diagrams showing how an optical part 1 and a pickup case 2 both included in an optical pickup device according to still another embodiment are fixed together by laser welding. In this embodiment, each surface portion to be joined to the optical part 1 of the pickup case 2 has a convex part 2a to be laser welded to the corresponding one of protruding parts 1c of the optical part 1. The convex parts 2a of the pickup case 2 each have a flat top surface the whole width of which is laser welded to the corresponding protruding part 1c of the optical part 1. Forming the convex parts 2a such that they fit the target weld positions (welding widths), respectively, makes positioning the optical part 1 and the pickup case 2 for welding easy. This also makes it easy to visually detect inaccurately positioned laser welded parts, should such inaccurate positioning occur. In the embodiments shown in FIGS. 8 and 9, too, the lens center portion 1d is preferably at the same height as the laser weld portions 4.

Embodiment 4

Figure 10:
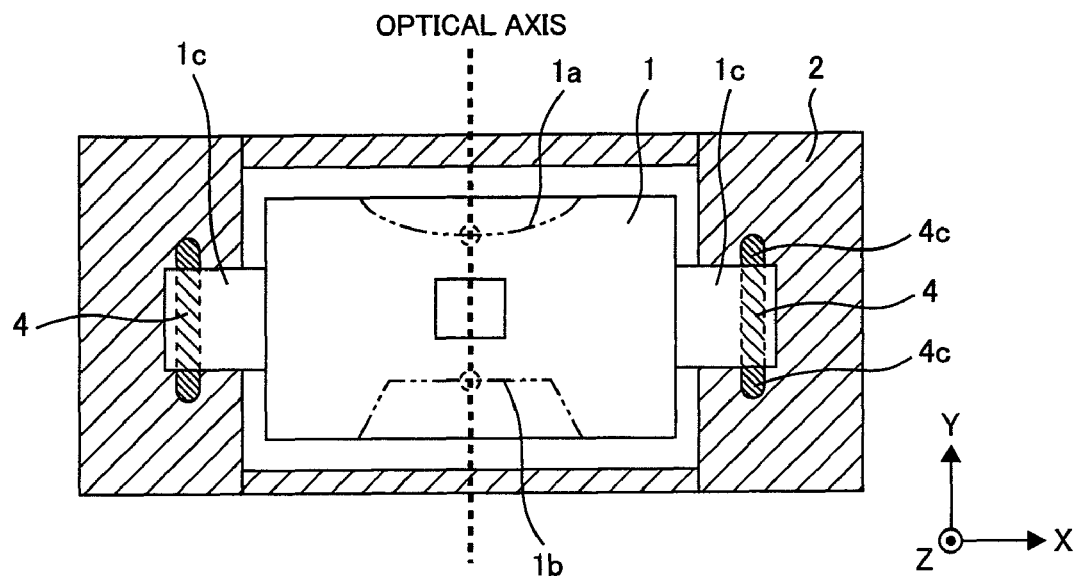
FIG. 10 is a plan view showing how an optical part 1 and a pickup case 2 both included in an optical pickup device according to still another embodiment of the present invention are fixed together by laser welding (Embodiment 4)

FIG. 10 is a plan view showing how an optical part 1 and a pickup case 2 both included in an optical pickup device according to still another embodiment are fixed together by laser welding. In this embodiment, each of linear weld portions 4 extends beyond the corresponding joint area between the optical part 1 (protruding part 1c) and the pickup case 2. Namely, one end portion 4c where laser irradiation starts of each linear weld portion 4 and the other end portion 4c where laser irradiation ends of each linear weld portion 4 are located outside the corresponding end portions of the corresponding joint area, respectively. This is to cope with a tendency in which, when two parts are laser welded at a linear laser weld portion, an excessive amount of heat is inputted to an end portion where laser irradiation starts of the linear weld portion and also to the other end portion where laser irradiation ends of the linear weld portion. When it occurs, the two parts cannot be laser welded under uniformly optimum welding conditions, so that satisfactory joint properties may not be obtained. Locating the laser irradiation starting point and laser irradiation ending point outside the joint area as in the present embodiment makes it possible to obtain uniform and stable welding properties over the entire joint area.

Figure 11:
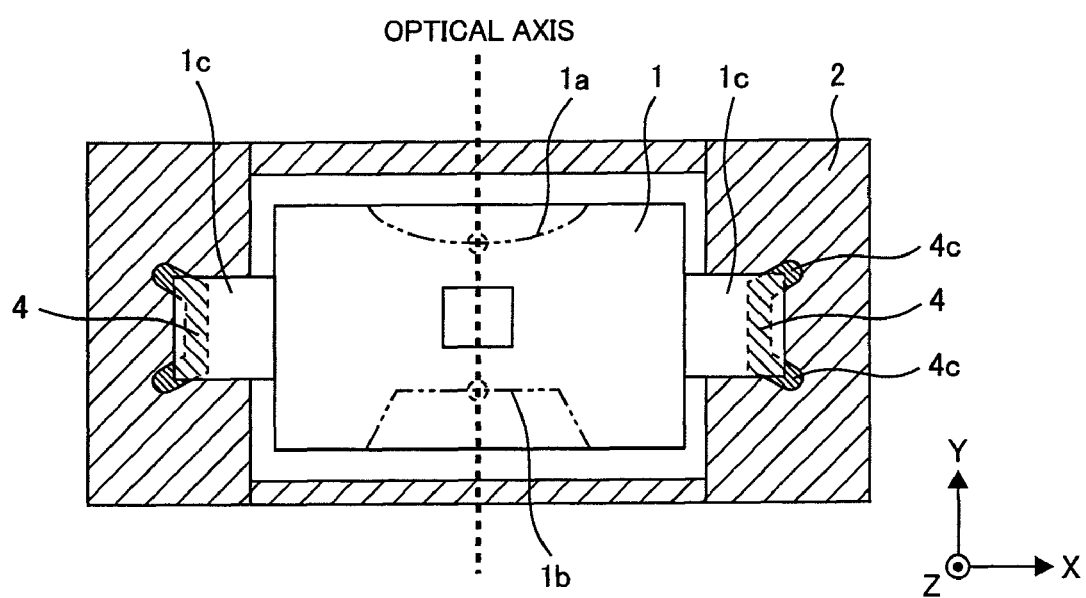
FIG. 11 is a plan view showing an example of modification of laser weld portions 4 shown in FIG. 10.

FIG. 11 is a plan view showing an example of modification of the laser weld portions 4 shown in FIG. 10. In this example, the end portions 4c of each of the laser weld portions 4 are bent outwardly with respect to the optical axis. In this example, the end portions 4c where laser irradiation is started and ended of each of the laser weld portions 4 are bent away from the optical part 1, so that the amount of outgas generated at the laser irradiation starting and ending points of each of the laser weld portions 4 and reaching the lens surfaces 1a and 1b is reduced. However, sharply bending the end portions of each of the laser weld portions 4 causes the sharply bent end portions to be subjected to excessive welding. It is therefore preferable to bend the end portions of each of the laser weld portions 4 at a gentle angle.

Figure 12:
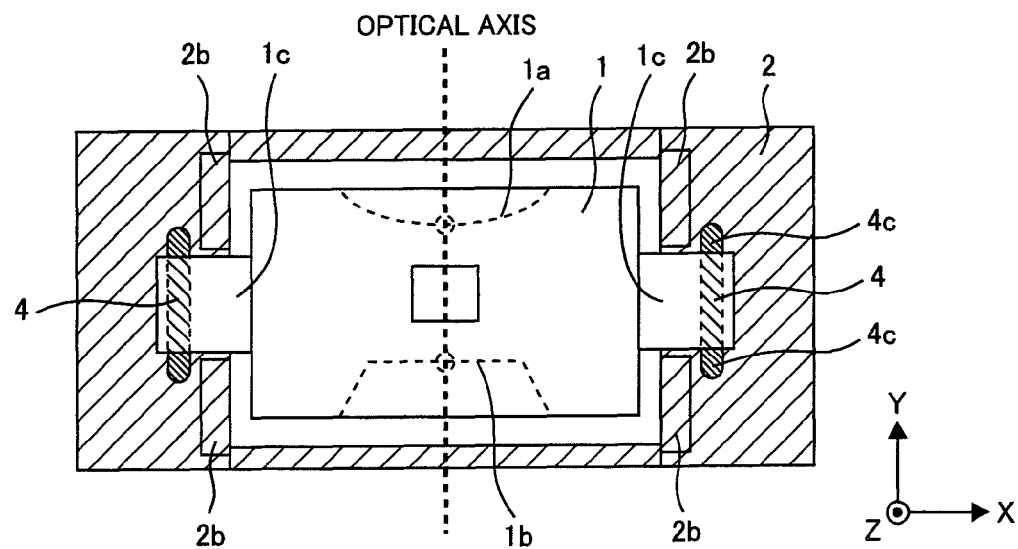
FIG. 12 is a plan view showing an example of modification of the pickup case 2 shown in FIG. 10.

FIG. 12 is a plan view showing an example of modification of the pickup case 2 shown in FIG. 10. In this example, the pickup case 2 has convex parts 2b one each of which is formed on the optical axis side of each of the end portions 4c of each of the laser weld portions 4, so that each of the convex parts 2b stands between the optical part 1 and the corresponding end portion 4c. The convex parts 2b are formed to be thicker than the thickness in the Z direction of the end portions 4c so as to prevent the outgas generated at the end portions 4c from reaching the lens surfaces 1a and 1b.

Figure 13:
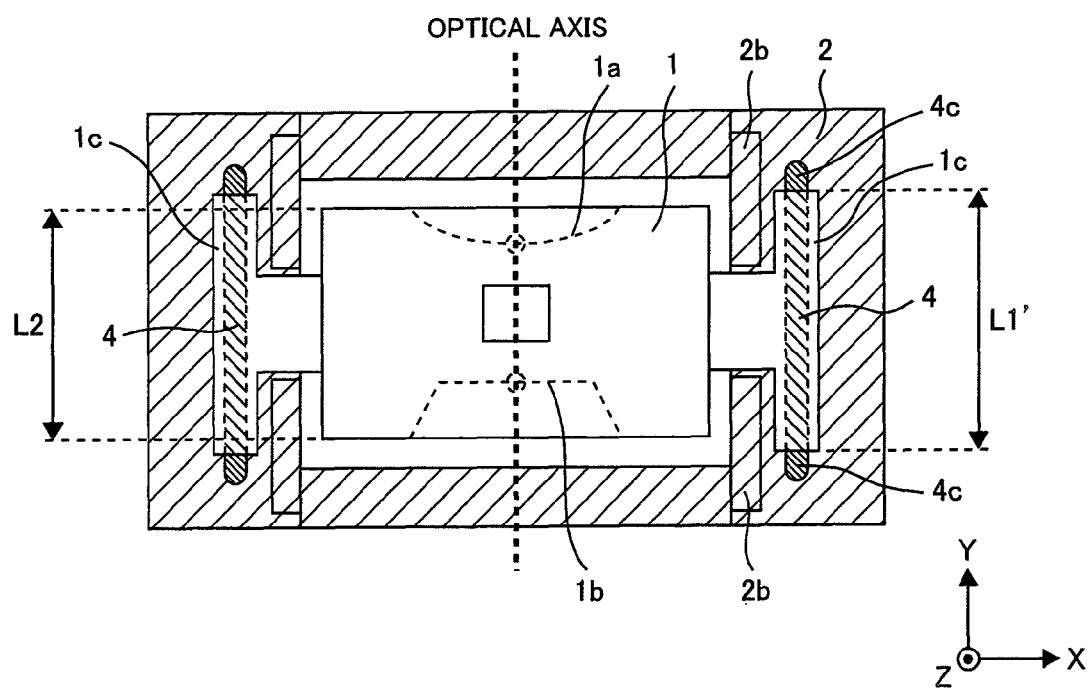
FIG. 13 is a plan view showing an example of modification of the laser weld portions 4 shown in FIG. 12.

FIG. 13 is a plan view showing an example of modification of the laser weld portions 4 shown in FIG. 12. In this example, protruding parts 1c to be laser welded to the pickup case 4 of the optical part 1 are lengthened in the Y direction. The length L1' of the protruding parts 1c is equal to or longer than the length L2 of the optical part 1. In such a structure, the laser weld portions 4 can have a large area (length), so that the welding strength of the optical part 1 can be increased. In this case, too, the convex parts 2b of the pickup case 2 can reduce the outgas reaching the lens surfaces 1a and 1b from the end portions 4c.

Embodiment 5

Figure 14A:
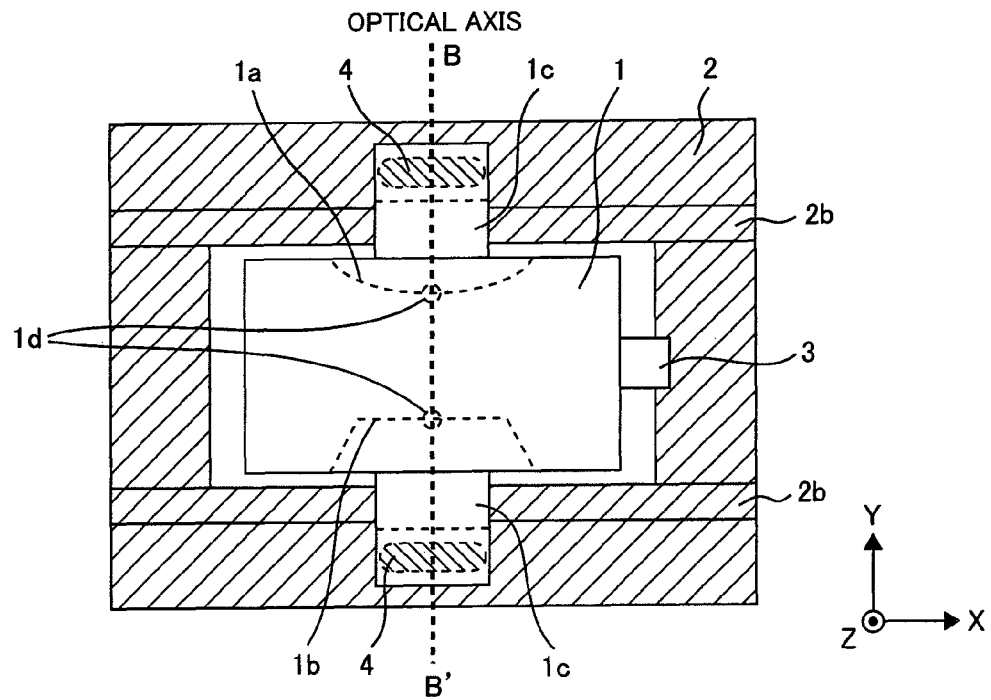
FIGS. 14A and 14B are structural diagrams showing how an optical part 1 and a pickup case 2 both included in an optical pickup device according to a still another embodiment of the present invention are fixed together by laser welding (Embodiment 5)
Figure 14B:
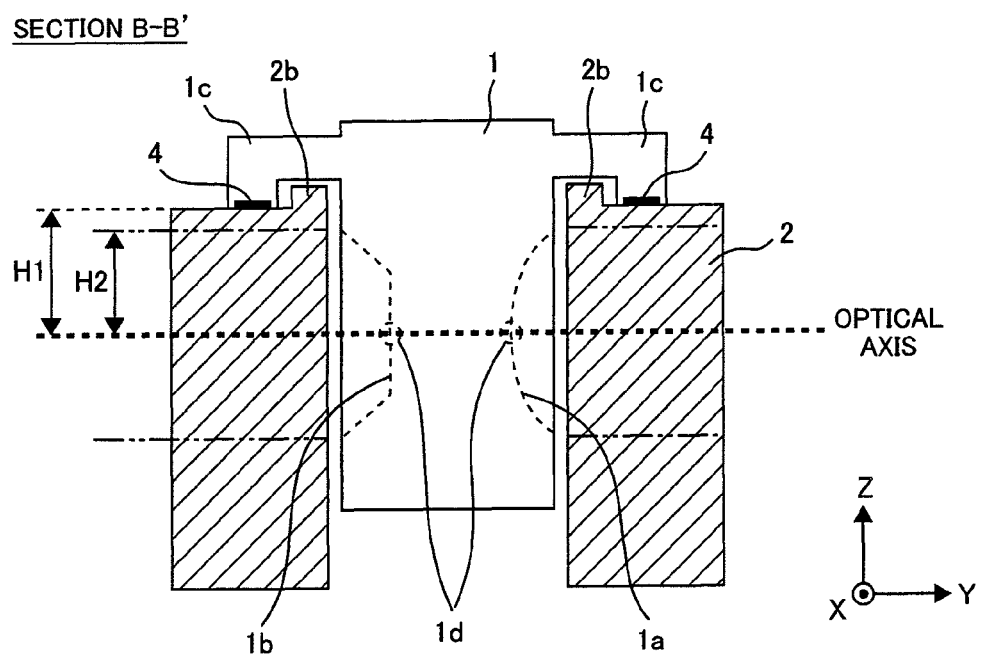

FIGS. 14A and 14B are structural diagrams showing how an optical part 1 and a pickup case 2 both included in an optical pickup device according to a still another embodiment are fixed together by laser welding. FIG. 14A is a plan view as seen from the Z direction. FIG. 14B is a sectional view along line B-B' of FIG. 14A (in the optical axis direction) as seen from the X direction. In this embodiment, portions outside lens surfaces 1a and 1b of the optical part 1 are extended along the optical axis (in the Y direction), and a protruding part 1c used to laser weld the optical part 1 to the pickup case 2 is provided at an end portion of each of the extended portions. In this embodiment, therefore, laser weld portions 4 are located vertically above the optical axis with the lens surfaces 1a and 1b located between the laser weld portions 4. This embodiment is effective in cases where, because of design restrictions for the optical pickup device 10, the optical part 1 cannot be laser welded at its end portions in the X direction. In this embodiment, the protruding parts 1c are located adequately away from the optical axis. Namely, the height H1 from the optical axis of the laser weld portions 4 is greater than the outer peripheral height H2 from the optical axis of the lens surfaces 1a and 1b, so that the protruding parts 1c do not interfere with the light transmitting areas of the lens surfaces 1a and 1b.

In the present embodiment, the joint surface (plane XY) between the optical part 1 and the pickup case 2 is in a plane perpendicular to the lens surfaces 1a and 1b (plane XZ) (i.e. parallel to the optical axis), so that the outgas generated at the laser weld portions 4 can be inhibited from depositing on the lens surfaces 1a and 1b. Furthermore, with convex parts 2b formed on the upper surface of the pickup case 2, the outgas generated at the laser weld portions 4 can be prevented from reaching the lens surfaces 1a and 1b. The convex parts 2b are desired to be as high as possible.

The protruding parts 1c of the optical part 1 and the laser weld portions 4 need not necessarily be provided at two locations on both sides. They need not be vertically above the optical axis (X=0), either. In cases where the optical part 1 is laser welded to the pickup case 2 on one side only, changes in ambient conditions (e.g. temperature) cause the optical part 1 to be shifted along the optical axis (Y direction). Normally, however, greater shifting of the optical part 1 is tolerated in the optical axis direction (Y direction) than in other directions, so that, in many cases, shifting of the optical part 1 along the optical axis (Y direction) poses no problem.

Embodiment 6

Figure 15A:
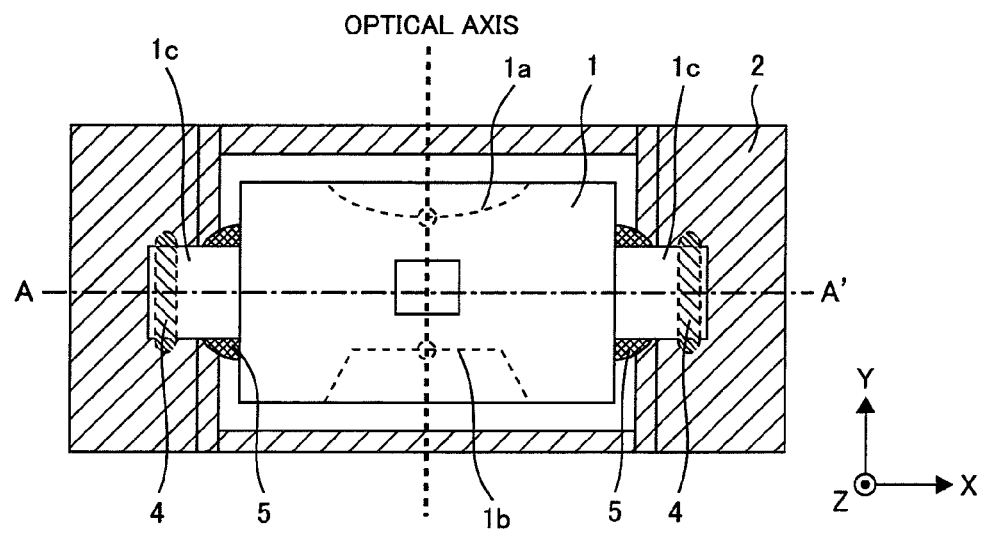
FIGS. 15A and 15B are structural diagrams showing how an optical part 1 and a pickup case 2 both included in an optical pickup device according to a still another embodiment of the present invention are fixed together by laser welding (Embodiment 6)
Figure 15B:
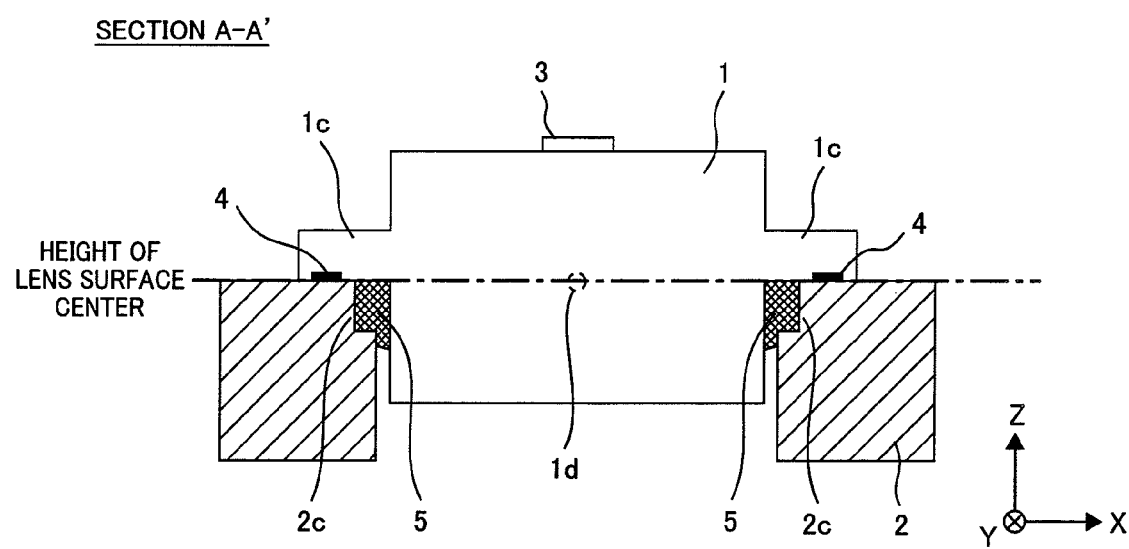

FIGS. 15A and 15B are structural diagrams showing how an optical part 1 and a pickup case 2 both included in an optical pickup device according to a still another embodiment are fixed together by laser welding. FIG. 15A is a plan view as seen from the Z direction. FIG. 15B is a sectional view along line A-A' of FIG. 15A as seen from the Y direction. In this example, protruding parts 1c of the pickup case 2 are laser welded to the pickup case 2, and the joints between the optical part 1 and the pickup case 2 are reinforced by applying an ultraviolet-curing adhesive 5 to their vicinities. Notches 2c to which the adhesive 5 is to be applied using a dispenser are formed in the pickup case 2 beforehand. In this embodiment, laser welding of the optical part 1 to the pickup case 2 is reinforced by the adhesive 5, so that the joint strength between them is increased. Intrinsically, the adhesive 5 expands by absorbing water and contracts when heated. Laser weld portions 4 can inhibit the effects of such properties of the adhesive 5. Since the adhesive 5 is used to reinforce the joints between the optical part 1 and the pickup case 2, the type of adhesive to be used can be determined easily. Even if the locations where the adhesive is applied and the amounts of the adhesive applied somewhat vary, no problem is caused. If the optical part 1 is to be fixed to the pickup case 2 by an adhesive only, it is necessary to determine and develop a suitable ultraviolet-curing adhesive by tuning various adhesive properties including, for example, water absorption rate, glass transition temperature, and modulus of elasticity so as not to allow the adhesive to expand or contract. In the present embodiment, the adhesive 5 to be used may be determined by taking into consideration only how quickly the adhesive solidly cures after being irradiated with ultraviolet rays.

Portions of the optical part 1 or pickup case 2 where the adhesive is applied may have various shapes as described below.

Figure 16:
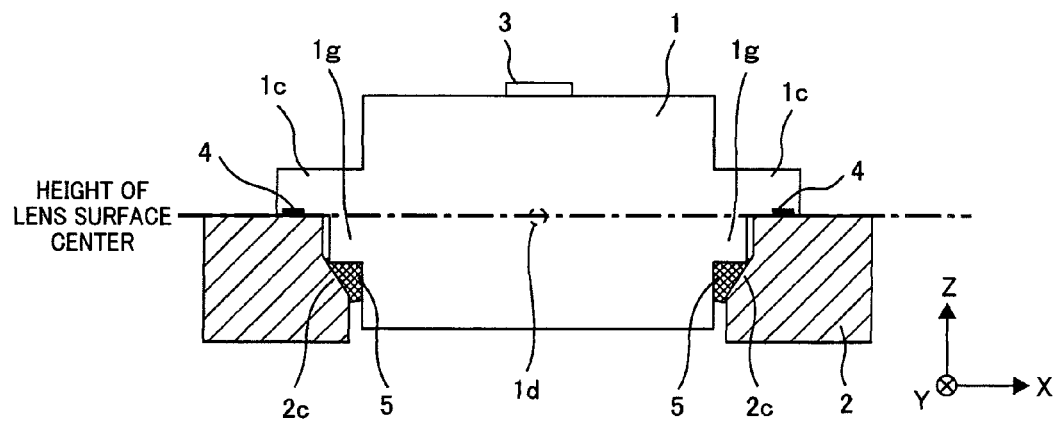
FIG. 16 is a sectional view showing an example of modification of adhesive-applied portions of the optical part 1 and pickup case 2 shown in FIG. 15.

FIG. 16 is a sectional view showing an example of modification of the adhesive-applied portions of the optical part 1 and pickup case 2 shown in FIG. 15. In this example, each of the protruding parts 1c of the optical part 1 has a convex part 1g formed on its joint-surface side so as to oppose the corresponding one of the notches 2c of the pickup case 2. The optical part 1 and the pickup case 2 are bonded together by applying the adhesive to between each opposing pair of the convex parts 1g and notches 2c.

Figure 17:
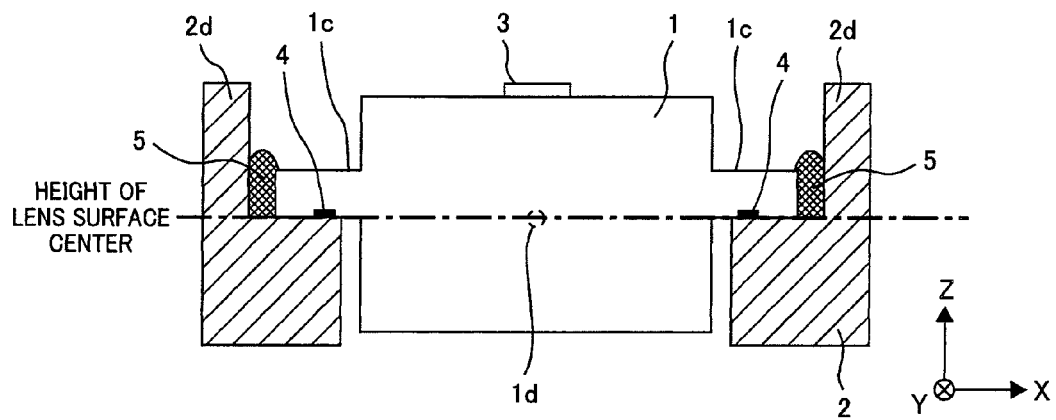
FIG. 17 is a sectional view showing another example of modification of the adhesive-applied portions of the optical part 1 and pickup case 2 shown in FIG. 15.

FIG. 17 is a sectional view showing another example of modification of the adhesive-applied portions of the optical part 1 and pickup case 2 shown in FIG. 15. In this example, the pickup case 2 has a protruding part 2d formed on its joint surface side on each side of the optical part 1. The adhesive 5 is applied to between each corresponding pair of the protruding parts 2d of the pickup case 2 and the protruding parts 1c of the optical part 1.

In the arrangements shown in FIGS. 16 and 17, the adhesive 5 does not easily infiltrate the laser weld portions 4, so that the joint properties of the laser weld portions are stably maintained.

Figure 18:
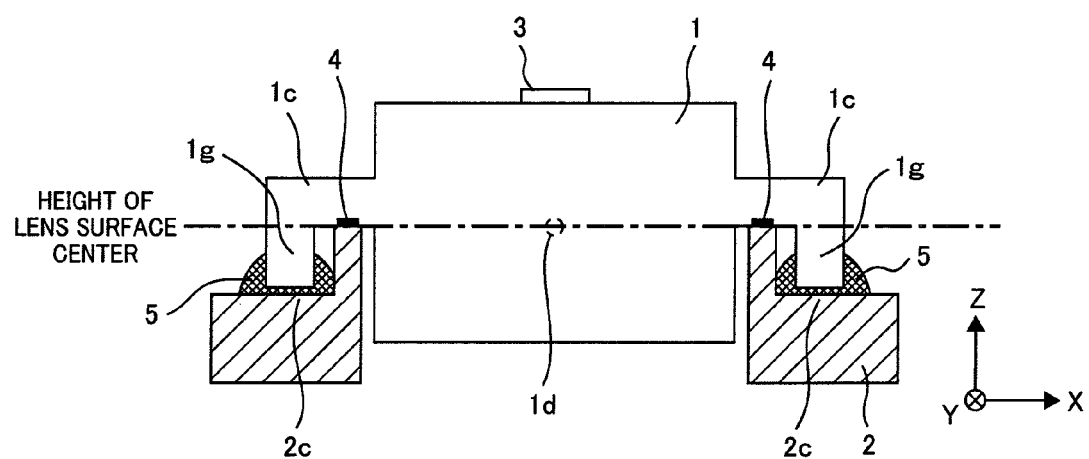
FIG. 18 is a sectional view showing still another example of modification of the adhesive-applied portions of the optical part 1 and pickup case 2 shown in FIG. 15.

FIG. 18 is a sectional view showing still another example of modification of the adhesive-applied portions of the optical part 1 and pickup case 2 shown in FIG. 15. In this example, each of the protruding parts 1c of the optical part 1 has a downwardly convex part 1g formed on its joint surface side, and the pickup case 2 has a concave part 2c formed on its joint surface side on each side of the optical part 1. The adhesive 5 is applied to the gap between each corresponding pair of the convex parts 1g and concave parts 2c.

Figure 19:
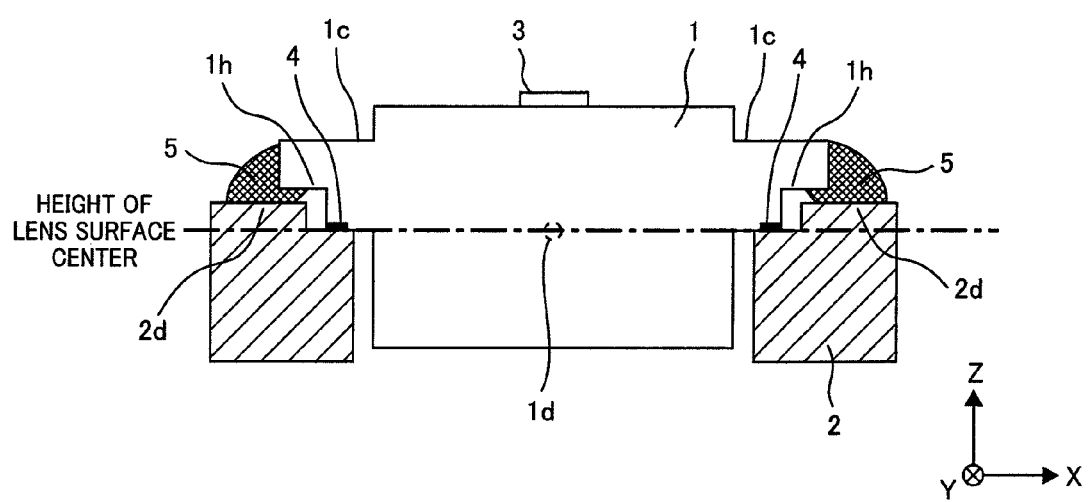
FIG. 19 is a sectional view showing still another example of modification of the adhesive-applied portions of the optical part 1 and pickup case 2 shown in FIG. 15.

FIG. 19 is a sectional view showing still another example of modification of the adhesive-applied portions of the optical part 1 and pickup case 2 shown in FIG. 15. In this example, each of the protruding parts 1c of the optical part 1 has a notch 1h formed on its joint surface side, and the pickup case 2 has a convex part 2d formed on its joint surface side on each side of the optical part 1. The adhesive 5 is applied to the gap between each corresponding pair of the notches 1h and convex parts 2d.

In the arrangements shown in FIGS. 18 and 19, the laser weld portions 4 and the adhesive 5 differ in height from the bottom surface of the pickup case 2, so that the adhesive 5 does not interfere with the laser weld portions 4. This allows the joint properties of the laser weld portions 4 to be stably maintained.

The laser weld portions 4 and the adhesive-applied portions need not be provided in two locations each. They are required in at least one location each. When only one laser weld portion is provided, the welding strength of the laser weld portion can be reinforced by applying the adhesive 5 to an unwelded portion corresponding to the laser weld portion. This makes up an efficient arrangement.

The concave and convex portions formed on the optical part 1 and pickup case 2 may be shaped differently than described above as long as the joint surfaces (plane XY) between the optical part 1 and the pickup case 2 can be irradiated with a laser beam and ultraviolet rays. Since the laser weld portions 4 are used to maintain positioning accuracy between the optical part 1 and the pickup case 2, it is preferable to align the heights of the laser weld portions 4 with the height of the center portion 1d.

When fixing the optical part 1 to the pickup case 2 both by laser welding and by use of an adhesive, it is desirable to design a work process taking the following into consideration. When the optical part 1 is small, laser welding the optical part 1 often involves interference between laser irradiation and a welding jig. In cases where such interference between a jig and laser irradiation makes laser welding difficult, it is advisable to perform laser welding after temporarily fixing the optical part 1 and the pickup case 2 together using an ultraviolet-curing adhesive. With the optical part 1 and the pickup case 2 temporarily fixed using an adhesive, they can be laser welded while applying a smaller pressing force than otherwise required to hold them in position. This is an efficient method in cases where the optical part 1 to be laser welded largely varies in aberration. The adhesive 5 to be used in such cases is only required to keep the optical part 1 in position while it is irradiated with a laser beam. Therefore, the adhesive 5 need not be completely cured as long as it can provide a bonding strength enough to hold the optical part 1 in position. For the adhesive 5 to be used in such cases, a subsequent batch process performed, in many cases, using an ultraviolet ray irradiation furnace may be made use of. Such an approach may be desirable in terms of overall process efficiency.

To make aberration variations due to changes in ambient temperature smaller for the optical part 1 to be fixed to the pickup case 2 both by laser welding and by use of an adhesive, such properties as the modulus of elasticity and hardness of the adhesive 5 used to fix the optical part 1 are desired to be lower than those of the lens material. The adhesive 5 used in the present embodiment need not necessarily be an ultraviolet-curing adhesive. It may be, for example, a thermosetting adhesive or a moisture-curing adhesive.

In the above embodiments, subjecting the optical part 1 or pickup case 2 to surface modification or cleaning, for example, by a UV/ozone method, corona discharge treatment, plasma treatment, or electron-beam treatment before fixing them together by laser welding or by using an adhesive can further increase the joint strength between them.

In recent years with optical pickup devices growing smaller and thinner, a capability to write data at high speed to optical disk media based on various standards is in demand. Developing an optical pickup device which is compatible with various standards for optical disk media will inevitably require coping with narrower design margins and devising a method to fix optical parts with higher accuracy. According to the embodiments described above, the optical part positioning accuracy can be largely improved and the device productivity can be remarkably increased compared with prior-art cases where optical parts are fixed only by using an adhesive. Hence, the present invention can largely contribute toward improving the reliability of and reducing the costs of optical pickup devices and optical disk drive units.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical pickup device comprising a pickup case formed of a first resin and an optical part formed of a second resin, the optical part being fixedly joined to the pickup case at a predetermined location on an optical path of the pickup case,
   wherein the optical part has a lens surface facing in an optical axis direction and a protruding part formed, to be joined to the pickup case, at an end portion thereof in a direction perpendicular to the optical axis,
   wherein a joint surface between the protruding part and the pickup case extends in a direction parallel to the optical axis, and
   wherein the joint surface is fixed by a weld portion which is formed by laser irradiation on the joint surface,
   wherein the joint surface is parallel to a bottom surface of the pickup case, and the joint surface is located approximately at a center of the optical part,
   wherein the protruding part of the optical part is provided at each of two locations which are mutually symmetrical with respect to the optical axis, only the protruding part at one of the two locations including a weld portion formed on a joint surface between the protruding part and the pickup case.

2. An optical pickup device comprising a pickup case formed of a first resin and an optical part formed of a second resin, the optical part being fixedly joined to the pickup case at a predetermined location on an optical path of the pickup case,
   wherein the optical part has a lens surface facing in an optical axis direction and a protruding part formed, to be joined to the pickup case, at an end portion thereof in a direction perpendicular to the optical axis,
   wherein a joint surface between the protruding part and the pickup case extends in a direction parallel to the optical axis, and
   wherein the joint surface is fixed by a weld portion which is formed by laser irradiation on the joint surface,
   wherein an end portion of the weld portion extends to outside a joint area between the protruding part of the optical part and the pickup case.

3. The optical pickup device according to claim 2,
   wherein the pickup case has a convex part formed between the optical axis and the end portion of the weld portion, the convex part having a height greater than the thickness of the weld portion.

4. An optical pickup device comprising a pickup case formed of a first resin and an optical part formed of a second resin, the optical part being fixedly joined to the pickup case at a predetermined location on an optical path of the pickup case,
   wherein the optical part has a lens surface facing in an optical axis direction and a protruding part formed, to be joined to the pickup case, at an end portion thereof in a direction perpendicular to the optical axis,
   wherein a joint surface between the protruding part and the pickup case extends in a direction parallel to the optical axis, and
   wherein the joint surface is fixed by a weld portion which is formed by laser irradiation on the joint surface,
   wherein the protruding part of the optical part and the pickup case are fixedly joined, including the weld portion, to each other by an adhesive.

5. An optical pickup device comprising a pickup case formed of a first resin and an optical part formed of a second resin, the optical part being fixedly joined to the pickup case at a predetermined location on an optical path of the pickup case,
   wherein the optical part has a lens surface facing in an optical axis direction and a protruding part formed, to be joined to the pickup case, at an end portion thereof in a direction perpendicular to the optical axis,
   wherein a joint surface between the protruding part and the pickup case extends in a direction parallel to the optical axis, and
   wherein the joint surface is fixed by a weld portion which is formed by laser irradiation on the joint surface,
   wherein the protruding part of the optical part and the pickup case are fixedly joined, including the weld portion, to each other by an adhesive,
   wherein the weld portion and an area where the adhesive is applied differ in height from the bottom surface of the pickup case.

6. An optical pickup device comprising a pickup case formed of a first resin and an optical part formed of a second resin, the optical part being fixedly joined to the pickup case at a predetermined location on an optical path of the pickup case,
   wherein the optical part has a lens surface facing in an optical axis direction and a protruding part formed, to be joined to the pickup case, at an end portion thereof in a direction perpendicular to the optical axis,
   wherein a joint surface between the protruding part and the pickup case extends in a direction parallel to the optical axis, and
   wherein the joint surface is fixed by a weld portion which is formed by laser irradiation on the joint surface,
   wherein the protruding part of the optical part and the pickup case are fixedly joined, including the weld portion, to each other by an adhesive,
   wherein the adhesive is lower in modulus of elasticity than a material of which the optical part is formed.

7. An optical pickup device comprising a pickup case formed of a first resin and an optical part formed of a second resin, the optical part being fixedly joined to the pickup case at a predetermined location on an optical path of the pickup case,
   wherein the optical part has a lens surface facing in an optical axis direction and a protruding part formed, to be joined to the pickup case, at an end portion thereof in a direction perpendicular to the optical axis,
   wherein a joint surface between the protruding part and the pickup case extends in a direction parallel to the optical axis, and
   wherein the joint surface is fixed by a weld portion which is formed by laser irradiation on the joint surface,
   wherein the protruding part of the optical part and the pickup case are fixedly joined, including the weld portion, to each other by an adhesive,
   wherein the adhesive is lower in hardness than a material of which the optical part is formed.

* * * * *